(12) United States Patent
Nose et al.

(10) Patent No.: US 11,536,212 B2
(45) Date of Patent: Dec. 27, 2022

(54) CONTROLLER AND CONTROL METHOD FOR INTERNAL COMBUSTION ENGINE

(71) Applicant: TOYOTA JIDOSHA KABUSHIKI KAISHA, Aichi-ken (JP)

(72) Inventors: Yuki Nose, Nagoya (JP); Yuto Ikeda, Okazaki (JP); Takanobu Gotoh, Obu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/723,407

(22) Filed: Apr. 18, 2022

(65) Prior Publication Data

US 2022/0341368 A1 Oct. 27, 2022

(30) Foreign Application Priority Data

Apr. 21, 2021 (JP) .............................. JP2021-071701

(51) Int. Cl.
*F02D 41/02* (2006.01)
*F01N 3/021* (2006.01)
*F02D 41/00* (2006.01)

(52) U.S. Cl.
CPC ......... *F02D 41/0235* (2013.01); *F01N 3/021* (2013.01); *F02D 41/0087* (2013.01); *F02D 2041/0265* (2013.01); *F02D 2200/08* (2013.01)

(58) Field of Classification Search
CPC combination set(s) only.
See application file for complete search history.

(56) References Cited

U.S. PATENT DOCUMENTS

| 10,309,329 | B2 | 6/2019 | Tsunoda et al. | |
|---|---|---|---|---|
| 10,480,381 | B2 | 11/2019 | Suzuki et al. | |
| 2006/0016180 | A1* | 1/2006 | Tomita | F02D 41/029 60/287 |
| 2009/0112447 | A1* | 4/2009 | Ishizuka | F02D 41/18 701/109 |
| 2010/0108045 | A1* | 5/2010 | Enomoto | F02D 41/2441 123/703 |
| 2010/0205942 | A1* | 8/2010 | Fujiwara | F02D 41/029 60/285 |
| 2016/0273465 | A1* | 9/2016 | Nishijima | F01N 3/101 |

(Continued)

FOREIGN PATENT DOCUMENTS

JP 2019-190358 A 10/2019

*Primary Examiner* — Binh Q Tran
(74) *Attorney, Agent, or Firm* — Hauptman Ham, LLP

(57) ABSTRACT

A controller executes a first suspending process or a second suspending process when a vehicle satisfies a predetermined first condition or a predetermined second condition. The controller executes an integration process that, during execution of the first suspending process or the second suspending process, obtains an integrated value of an intake air amount of the internal combustion engine from when the first suspending process or the second suspending process that is being executed was started. When the integrated value is greater than or equal to a threshold, the controller stops the first suspending process or the second suspending process that is being executed. When the amount of particular matter deposited in a filter is the same, a first threshold, which is the threshold for the first suspending process, is greater than a second threshold, which is the threshold for the second suspending process.

7 Claims, 3 Drawing Sheets

(56) References Cited

U.S. PATENT DOCUMENTS

| | | | | |
|---|---|---|---|---|
| 2019/0048813 A1* | 2/2019 | Dudar | ................ | F02D 41/0087 |
| 2019/0107067 A1* | 4/2019 | Akutsu | ............... | F02D 41/1454 |
| 2021/0316715 A1* | 10/2021 | Nose | .................... | F02D 41/123 |

* cited by examiner

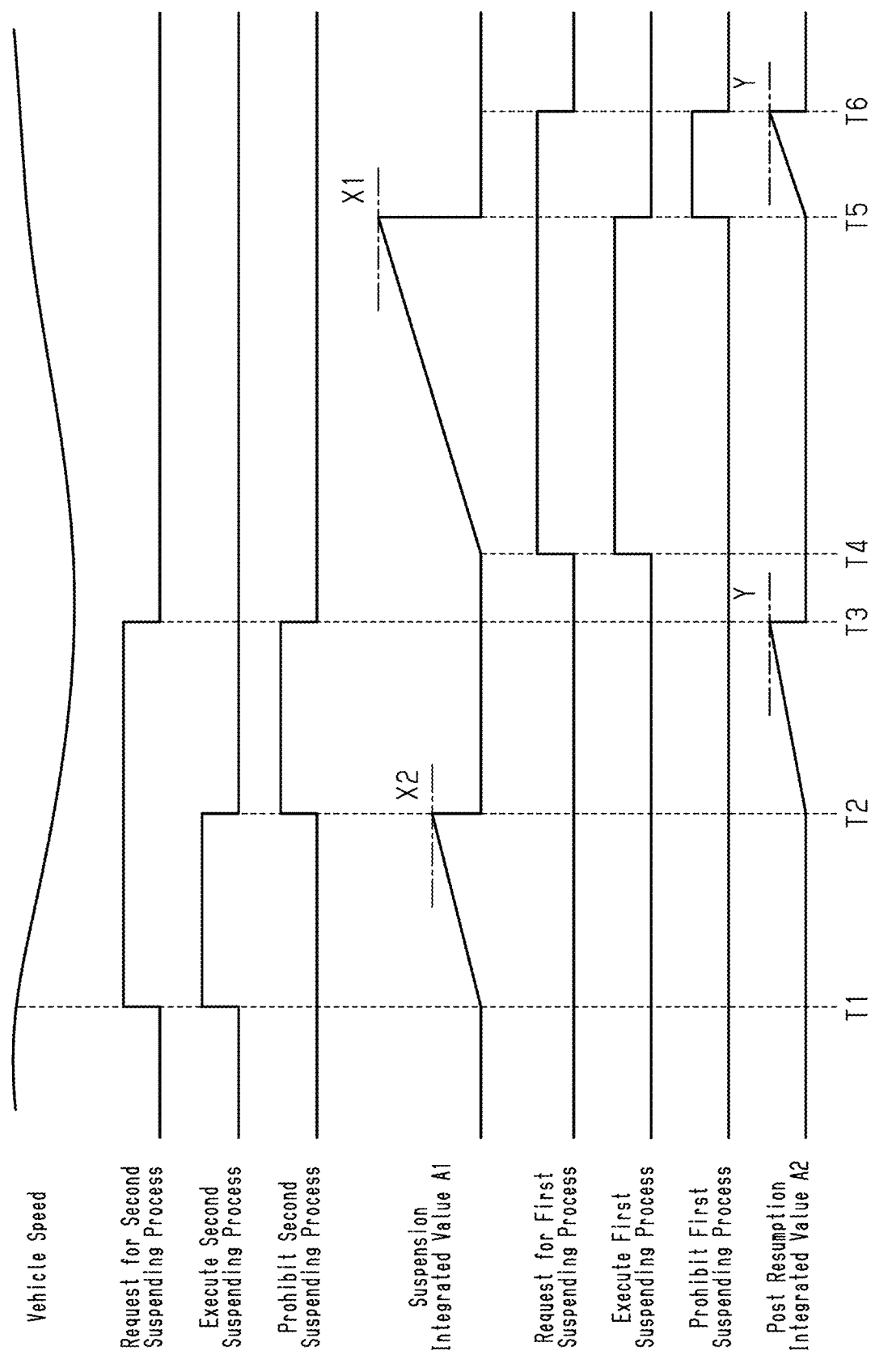

CONTROLLER AND CONTROL METHOD FOR INTERNAL COMBUSTION ENGINE

RELATED APPLICATIONS

The present application claims priority of Japanese Application Number 2021-071701 filed on Apr. 21, 2021, the disclosure of which is hereby incorporated by reference herein in its entirety.

BACKGROUND

1. Field

The present disclosure relates to a controller for an internal combustion engine.

2. Description of Related Art

Japanese Laid-Open Patent Publication No. 2019-190358 discloses a vehicle equipped with an internal combustion engine, an exhaust passage, and a filter. The internal combustion engine has cylinders. The exhaust passage includes flow passages extending from the respective cylinders. The exhaust passage extends from the internal combustion engine. A filter traps particulate matter (hereinafter, referred to as PM) in the exhaust passage. The filter is located in the middle of the exhaust passage. The vehicle also includes a controller. When the vehicle satisfies a specific condition, the controller suspends combustion of air-fuel mixture in all the cylinders while rotating a crankshaft. This supplies air containing oxygen to the filter. As a result, the PM deposited in the filter is burned. If an integrated value of the intake air amount reaches a specified value while combustion of air-fuel mixture in the cylinders is suspended, the controller restarts combustion of air-fuel mixture in the cylinders. This stops the burning of PM, thereby preventing the filter from being excessively heated.

A technology has been known that suspends combustion of air-fuel mixture only in a specific cylinder unlike the vehicle disclosed in Japanese Laid-Open Patent Publication No. 2019-190358, in which combustion is suspended in all the cylinders. With this technology, the manner in which the temperature of the filter changes during burning of PM is thought to be different from that in a case in which combustion is suspended in all the cylinders. Accordingly, if the process of suspending combustion of air-fuel mixture only in a specific cylinder is carried out, there is room for further study on the time at which the process should be suspended.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller configured to be employed in a vehicle is provided. The vehicle includes an internal combustion engine including cylinders, an exhaust passage through which an exhaust gas from the cylinders flows, and a filter arranged in the exhaust passage to trap particulate matter in exhaust gas. The controller is configured to control the internal combustion engine. The controller is configured to execute: a first suspending process that, when the vehicle satisfies a predetermined first condition, suspends combustion of air-fuel mixture in a specific one of the cylinders; a second suspending process that, when the vehicle satisfies a predetermined second condition, suspends combustion of air-fuel mixture in all the cylinders, the second condition being different from the first condition; an integration process that, during execution of the first suspending process or the second suspending process, obtains an integrated value of an intake air amount of the internal combustion engine from when the first suspending process or the second suspending process that is being executed was started; and a resumption process that, when the integrated value is greater than or equal to a threshold, stops the first suspending process or the second suspending process that is being executed, and resumes combustion of air-fuel mixture in all the cylinders. The threshold during the execution of the first suspending process is referred to as a first threshold. The threshold during the execution of the second suspending process is referred to as a second threshold. The first threshold is greater than the second threshold when an amount of particulate matter deposited in the filter is the same.

During the first suspending process, the above-described configuration supplies, to the filter, burned gas discharged from a cylinder in which combustion is not suspended. When the burned gas is supplied to the filter, the burned gas takes away the heat of the filter. Thus, the temperature of the filter is less likely to increase when the first suspending process is executed than when the second suspending process is executed.

Taking into consideration the fact that the temperature of the filter is not easily increased in the first suspending process, the first threshold has a value greater than the second threshold in the above-described configuration. Thus, when executed, the first suspending process is unlikely to be stopped despite the fact that the filter has not been excessively heated, so that the first suspending process can be continued.

In the above-described configuration, the controller is configured to execute a threshold calculating process that calculates the first threshold and the second threshold based on the amount of particulate matter deposited in the filter. In the threshold calculating process, the controller calculates the first threshold such that the first threshold increases as the number of the cylinders in which combustion of air-fuel mixture is stopped during the execution of the first suspending process decreases.

With the above-described configuration, the amount of burned gas discharged from the cylinders in which combustion of air-fuel mixture is performed increases as the number of cylinders in which combustion is suspended decreases. This results in a greater amount of heat being taken away from the filter by the burned gas, so that the temperature of the filter is unlikely to increase. Since the above-described configuration calculates the first threshold in accordance with the number of the cylinders in which combustion of air-fuel mixture is suspended, it is possible to extend the first suspending process as long as possible while preventing the filter from being excessively heated.

In the above-described configuration, the controller is configured to execute a threshold calculating process that calculates the first threshold and the second threshold based on the amount of particulate matter deposited in the filter. In the threshold calculating process, the controller calculates the first threshold and the second threshold such that the first threshold and the second threshold decrease as the amount of particulate matter deposited in the filter at a start of the first suspending process or the second suspending process increases. In the threshold calculating process, the controller calculates the first threshold and the second threshold such that the first threshold and the second threshold decrease as a temperature of the filter at the start of the first suspending process or the second suspending process increases.

With the above-described configuration, the amount of heat generated by burning particulate matter in each suspending process and the temperature at the start of each suspending process can be reflected on the first threshold and the second threshold. Accordingly, it is possible to calculate accurate thresholds for preventing the filter from being excessively heated.

In the above-described configuration, the controller is configured to prohibit execution of the first suspending process and the second suspending process for a predetermined certain amount of time after executing the resumption process.

With the above-described configuration, the suspending processes are not executed again after the execution of the resumption process in a state in which a large amount of oxygen still remains in the filter due to the suspending processes. This prevents the filter from being excessively heated by a large amount of oxygen remaining in the filter when the suspending processes are each started.

In the above-described configuration, the certain amount of time is an amount of time until the integrated value that has been integrated from when the resumption process was executed reaches a predetermined defined value.

The above-described configuration discharges oxygen remaining in the filter together with the burned gas discharged from the cylinders after each of the suspending processes is ended. With the above-described configuration, a prohibition period of each suspending process after the resumption process is determined based on the intake air amount, which has a high correlation with the amount of decrease in the oxygen remaining in the filter. This allows the prohibition period to be set accurately in accordance with the actual rate at which the amount of oxygen in the filter decreases.

In another general aspect, a control method for an internal combustion engine is provided. The method is performed in a vehicle that includes an internal combustion engine including cylinders, an exhaust passage through which an exhaust gas from the cylinders flows, and a filter arranged in the exhaust passage to trap particulate matter in exhaust gas. The control method includes: executing a first suspending process that, when the vehicle satisfies a predetermined first condition, suspends combustion of air-fuel mixture in a specific one of the cylinders; executing a second suspending process that, when the vehicle satisfies a predetermined second condition, suspends combustion of air-fuel mixture in all the cylinders, the second condition being different from the first condition; during execution of the first suspending process or the second suspending process, obtaining an integrated value of an intake air amount of the internal combustion engine from when the first suspending process or the second suspending process that is being executed was started; and when the integrated value is greater than or equal to a threshold, stopping the first suspending process or the second suspending process that is being executed, and resuming combustion of air-fuel mixture in all the cylinders. The threshold during the execution of the first suspending process is referred to as a first threshold. The threshold during the execution of the second suspending process is referred to as a second threshold. The first threshold is greater than the second threshold when an amount of particulate matter deposited in the filter is the same.

In a further general aspect, a controller configured to be employed in a vehicle is provided. The vehicle includes an internal combustion engine including cylinders, an exhaust passage through which an exhaust gas from the cylinders flows, and a filter arranged in the exhaust passage to trap particulate matter in exhaust gas. The controller includes circuitry that is configured to control the internal combustion engine. The circuitry is configured to execute: a first suspending process that, when the vehicle satisfies a predetermined first condition, suspends combustion of air-fuel mixture in a specific one of the cylinders; a second suspending process that, when the vehicle satisfies a predetermined second condition, suspends combustion of air-fuel mixture in all the cylinders, the second condition being different from the first condition; an integration process that, during execution of the first suspending process or the second suspending process, obtains an integrated value of an intake air amount of the internal combustion engine from when the first suspending process or the second suspending process that is being executed was started; and a resumption process that, when the integrated value is greater than or equal to a threshold, stops the first suspending process or the second suspending process that is being executed, and resumes combustion of air-fuel mixture in all the cylinders. The threshold during the execution of the first suspending process is referred to as a first threshold. The threshold during the execution of the second suspending process is referred to as a second threshold. The first threshold is greater than the second threshold when an amount of particulate matter deposited in the filter is the same.

Other features and aspects will be apparent from the following detailed description, the drawings, and the claims.

BRIEF DESCRIPTION OF THE DRAWINGS

FIG. 3 is a timing diagram showing an example of changes over time of factors related to the first suspending process and the second suspending process in relation to an intake air amount.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller 100 according to one embodiment will now be described with reference to the drawings.

<Schematic Structure of Vehicle>

Figure 1:
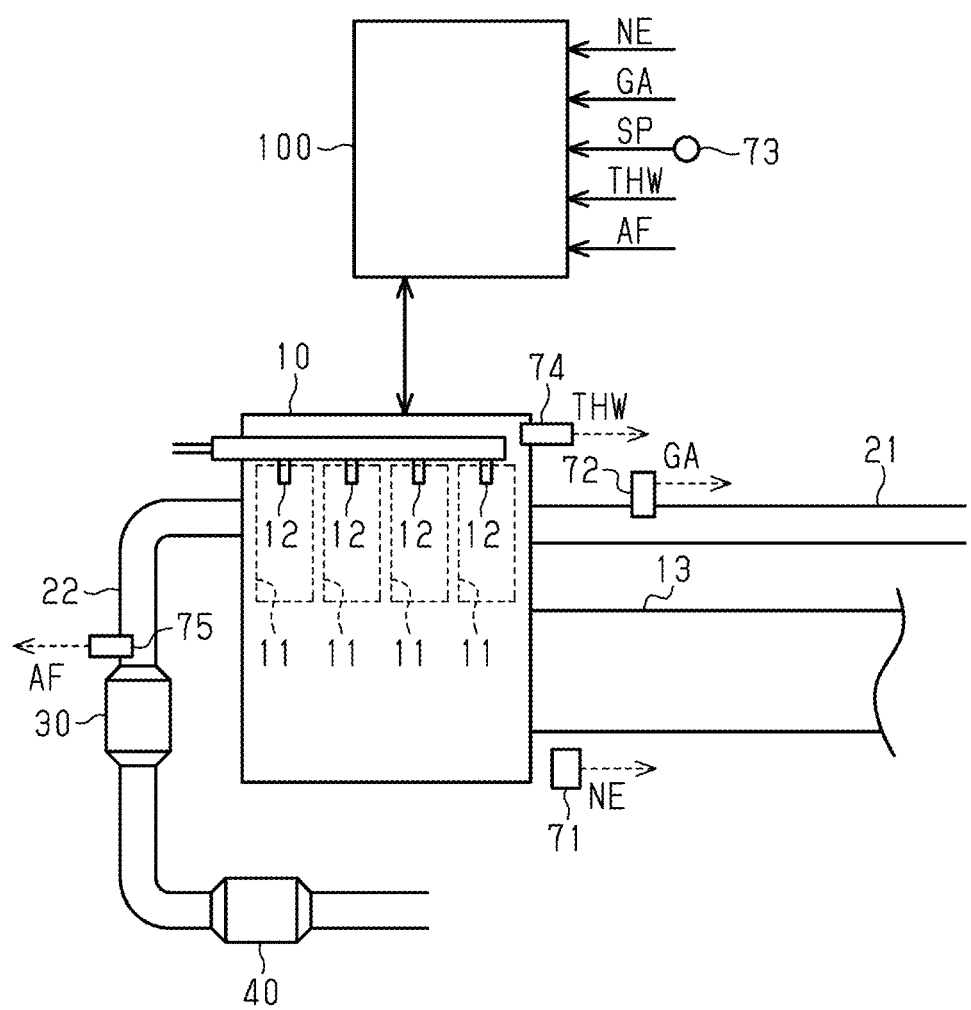
FIG. 1 is a schematic diagram showing a configuration of a vehicle.

As shown in FIG. 1 a vehicle includes an internal combustion engine 10, an intake passage 21, an exhaust passage 22, a three-way catalyst 30, and a filter 40.

The internal combustion engine 10 is a drive source of the vehicle. The internal combustion engine 10 includes four cylinders 11, four fuel injection valves 12, and a crankshaft 13. The four fuel injection valves 12 are provided for the respective cylinders 11. The fuel injection valves 12 inject fuel into the respective cylinders 11. The crankshaft 13 is rotated by combustion of air-fuel mixture in the cylinders 11. That is, the rotation of the crankshaft 13 generates driving force of the vehicle.

The intake passage 21 is connected to the cylinders 11. The intake passage 21 introduces intake air to the cylinders 11. The exhaust passage 22 is connected to the cylinders 11. The exhaust passage 22 includes a passage through which exhaust gas from the cylinders 11 flows. The three-way catalyst 30 is located in the exhaust passage 22. The three-way catalyst 30 removes hydrocarbon, carbon monoxide, and nitrogen oxide contained in the exhaust gas. The three-way catalyst 30 has an oxygen storage capacity. The filter 40 is located on a downstream side of the three-way catalyst 30 in the exhaust passage 22. The filter 40 traps particulate matter (hereinafter, referred to as PM) in the exhaust passage.

The vehicle includes a crank angle sensor 71, an air flow meter 72, a vehicle speed sensor 73, a coolant temperature sensor 74, and an air-fuel ratio sensor 75.

The crank angle sensor 71 is located in the vicinity of the crankshaft 13. The crank angle sensor 71 detects a rotation speed NE of the crankshaft 13. The air flow meter 72 is located in the intake passage 21. The air flow meter 72 detects an intake air amount GA, which is the flow rate of air that flows through the intake passage 21. The vehicle speed sensor 73 is located in the vicinity of a driven wheel of the vehicle. The vehicle speed sensor 73 detects a vehicle speed SP, which is the traveling speed of the vehicle. The coolant temperature sensor 74 is located at an outlet of a water jacket of the internal combustion engine 10. The coolant temperature sensor 74 detects a temperature THW of the coolant. The air-fuel ratio sensor 75 is located on an upstream side of the three-way catalyst 30 in the exhaust passage 22. The air-fuel ratio sensor 75 detects an air-fuel ratio AF.

<Controller>

The vehicle includes the controller 100. The controller 100 controls the internal combustion engine 10. Specifically, the controller 100 controls an amount of fuel injected by the fuel injection valves 12. The controller 100 acquires a signal related to a rotation speed NE from the crank angle sensor 71. The controller 100 acquires a signal related to the intake air amount GA from the air flow meter 72. The controller 100 acquires a signal related to the vehicle speed SP from the vehicle speed sensor 73. The controller 100 acquires a signal related to the temperature THW of the coolant from the coolant temperature sensor 74. The controller 100 acquires a signal related to the air-fuel ratio AF from the air-fuel ratio sensor 75.

The controller 100 calculates a charging efficiency η, which is an intake efficiency of the internal combustion engine 10, based on the acquired rotation speed NE and intake air amount GA. The charging efficiency η represents a cylinder inflow air amount, which is the mass of intake air flowing into the cylinders 11. Specifically, the charging efficiency η indicates the ratio of the cylinder inflow air amount to the mass of intake air under the standard atmospheric condition to the piston displacement of the cylinder.

Also, the controller 100 calculates the amount of PM deposited in the filter 40 (PM deposition amount) based on the calculated charging efficiency η and the acquired rotation speed NE and temperature THW. Specifically, the controller 100 calculates the amount of PM in the exhaust gas discharged to the exhaust passage 22 based on the rotation speed NE, the charging efficiency η, and the temperature THW of the coolant. The controller 100 then calculates the temperature of the filter 40 based on the rotation speed NE and the charging efficiency η. Thereafter, the controller 100 calculates the amount of PM trapped by the filter 40 per unit time based on the amount of PM in the exhaust gas and the temperature of the filter 40. The PM deposition amount is calculated in this manner. The PM deposition amount increases as the rotation speed NE increases. The temperature of the filter 40 is also calculated to be higher as the rotation speed NE or the charging efficiency η increases.

The controller 100 may include one or more processors that perform various processes according to computer programs (software). The controller 100 may be circuitry including one or more dedicated hardware circuits such as application specific integrated circuits (ASICs) that execute at least part of various processes, or a combination thereof. The processor includes a CPU and a memory such as a RAM and a ROM. The memory stores program code or instructions configured to cause the CPU to execute processes. The memory, which is a computer-readable medium, includes any type of media that are accessible by general-purpose computers and dedicated computers.

<Processes executed by Controller>

When the vehicle satisfies a predetermined first condition, the controller 100 performs a first suspending process that suspends combustion of air-fuel mixture in a specific one of the four cylinders 11. When performing the first suspending process, the controller 100 suspends fuel injection in the specific one of the four cylinders 11. The controller 100 injects fuel in the remaining three of the cylinders 11 to perform combustion of air-fuel mixture.

The controller 100 determines that the first condition is satisfied when the following five preconditions are all met, and performs the first suspending process.

A first precondition is that the vehicle speed SP is greater than zero. A second precondition is that the deposited amount of PM in the filter 40 is greater than a specified value. The specified value is set through experiments to a value at which a relatively large amount of PM has been deposited in the filter 40 and it is preferable to remove the PM. A third precondition is that the rotation speed NE is less than or equal to a specified value. This specified value is used when the execution condition for the first suspending process and an execution condition for a second suspending process, which will be discussed below, are switched. A fourth precondition is that torque generated at the crankshaft 13 is greater than torque transmitted from the wheels of the vehicle. A fifth precondition is that a prohibition flag, which will be discussed below, is OFF. Accordingly, a state in which the prohibition flag is ON is a state in which some of the preconditions of the first condition are not met, so that the execution of the first suspending process is prohibited.

When the vehicle satisfies a predetermined second condition, which is different from the first condition, the controller 100 performs the second suspending process that suspends combustion of air-fuel mixture in the four cylinders 11. That is, when executing the second suspending process, the controller 100 suspends fuel injection in all the four cylinders 11.

The controller 100 determines that the second condition is satisfied when the following five preconditions are all met, and performs the second suspending process. A first precondition is that the vehicle speed SP is greater than zero. A second precondition is that the deposited amount of PM in the filter 40 is greater than a specified value. The specified value is the same as that used for the above-described first condition. A third precondition is that the rotation speed NE is greater than the specified value. A fourth precondition is that the crankshaft 13 is rotating at no load. A fifth precondition is that a prohibition flag, which will be discussed below, is OFF. Accordingly, a state in which the prohibition flag is ON is a state in which some of the preconditions of the second condition are not met, so that the execution of the second suspending process is prohibited.

<Control during Execution of First Suspending Process and Second Suspending Process>

Control during the execution of the first suspending process and the second suspending process will now be described. The controller 100 performs this control each time the first suspending process or the second suspending process is started. If the vehicle stops satisfying the execution condition of the first suspending process or the execution condition of the second suspending process, the subsequent processes will not be executed.

Figure 2:
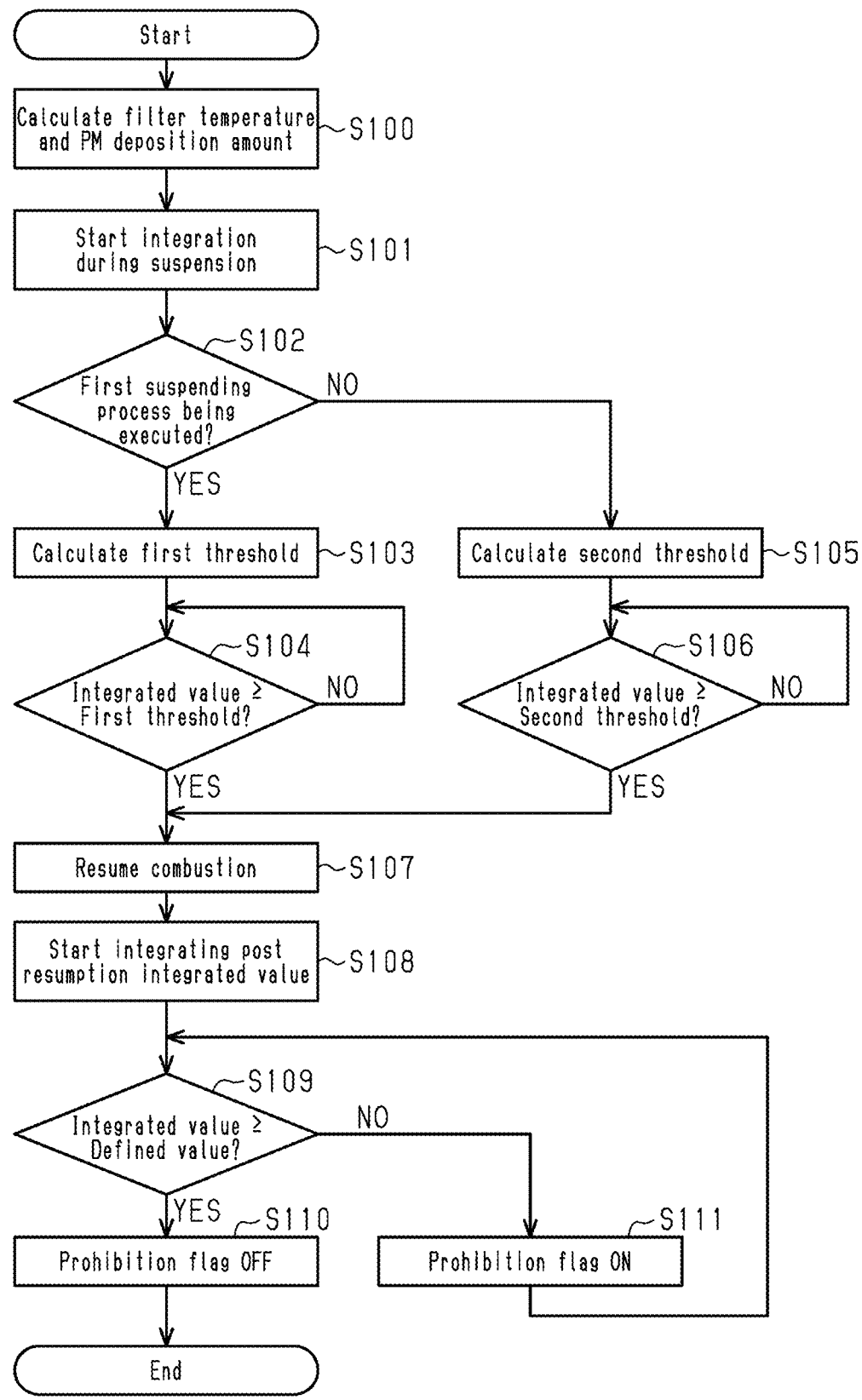
FIG. 2 is a flowchart showing a process executed by a controller.

As shown in FIG. 2, in step S100, the controller 100 calculates the PM deposition amount of the filter 40 and the temperature of the filter 40 at the start of the first suspending process or the second suspending process. After the calculation, the controller 100 advances the process to step S101.

In step S101, the controller 100 starts integrating the intake air amount GA. Specifically, when starting integrating the intake air amount GA, the controller 100 acquires data of the intake air amount GA from the air flow meter 72 at each unit time. Each time acquiring the data of the intake air amount GA, the controller 100 adds the newly acquired intake air amount GA to the integrated value from the previous cycle, thereby obtaining a new integrated value. After the process of step S101, the controller 100 continues updating the integrated value until the process of step S107, which will be discussed below, is started. In the following description, the integrated value of the intake air amount GA, which starts being integrated in step S101, will be referred to as a suspension integrated value A1. After starting integrating the intake air amount GA, the controller 100 advances the process to step S102. The process of step S101 is an integration process that obtains the suspension integrated value A1.

In step S102, the controller 100 checks whether the first suspending process is being executed. If the first suspending process is not being performed (S102: NO), that is, if the second suspending process is being performed, the controller 100 advances the process to step S105.

In step S105, the controller 100 calculates a second threshold X2, which is used in the second suspending process. The second threshold X2 is applied to the suspension integrated value A1. Specifically, the second threshold X2 is a determination value used to determine whether the second suspending process, which is being executed, should be stopped.

First, the controller 100 calculates the second threshold X2 based on the PM deposition amount of the filter 40 and the temperature of the filter 40, which have been calculated in step S100. Specifically, the controller 100 calculates the second threshold X2 such that the second threshold X2 decreases as the PM deposition amount of the filter 40 increases. Also, the controller 100 calculates the second threshold X2 such that the second threshold X2 decreases as the temperature of the filter 40 increases. After calculating the second threshold X2, the controller 100 advances the process to step S106.

In step S106, the controller 100 determines whether the latest suspension integrated value A1 is greater than or equal to the second threshold X2. When the latest suspension integrated value A1 is less than the second threshold X2 (S106: NO), the controller 100 executes the process of step S106 again. When the latest suspension integrated value A1 is greater than or equal to the second threshold X2 (S106: YES), the controller 100 advances the process to step S107.

When determining that the currently executed suspending process is the first suspending process in step S102 (S102: YES), the controller 100 advances the process to step S103.

In step S103, the controller 100 calculates a first threshold X1 as a threshold applied to the suspension integrated value A1. Specifically, the first threshold X1 is a determination value used to determine whether the first suspending process, which is being executed, should be stopped.

The controller 100 calculates the second threshold X2 in the same manner as in step S105. The controller 100 then multiplies the second threshold X2 by a predetermined coefficient to calculate the first threshold X1. The coefficient is set to a value greater than 1. That is, the controller 100 calculates the first threshold X1 such that the first threshold X1 is greater than the second threshold X2 for the same amount of PM. The coefficient is determined through experiments and simulation in the following manner. For example, an experiment is performed in which, during the execution of the second suspending process, the temperature of the filter 40 is set to a temperature that is lower than the melting temperature of the filter 40 by specified degrees. The suspension integrated value A1 at this time is obtained. Also, an experiment is performed in which, during the execution of the first suspending process, the temperature of the filter 40 is set to a temperature that is lower than the melting temperature of the filter 40 by the same specified degrees. The suspension integrated value A1 at this time is obtained. The above-described coefficient is defined as the ratio of the suspension integrated value A1 in the first suspending process to the suspension integrated value A1 in the second suspending process. After calculating the first threshold X1, the controller 100 advances the process to step S104. The processes of step S103 and step S105 correspond to a threshold calculating process that calculates a threshold based on the amount of PM deposited in the filter 40.

In step S104, the controller 100 determines whether the latest suspension integrated value A1 is greater than or equal to the first threshold X1. When the latest suspension integrated value A1 is less than the first threshold X1 (S104: NO), the controller 100 executes the process of step S104 again. When the latest suspension integrated value A1 is greater than or equal to the first threshold X1 (S104: YES), the controller 100 advances the process to step S107.

In step S107, the controller 100 stops the first suspending process or the second suspending process that is being executed. That is, the controller 100 resumes combustion of air-fuel mixture in the four cylinders 11. Also, the controller 100 clears the suspension integrated value A1, which has been continuously calculated, to zero. The controller 100 then suspends calculating the suspension integrated value A1. Thereafter, the controller 100 advances the process to step S108. The processes of step S104, step S106, and step S107 correspond to a resumption process that, when the suspension integrated value A1 is greater than or equal to a threshold, stops the first suspending process or the second suspending process that is being executed, and resumes combustion of air-fuel mixture in all the cylinders 11, that is, resumes normal operation.

In step S108, the controller 100 starts integrating the intake air amount GA in the same manner as in step S101. After the process of step S108, the controller 100 continues updating the integrated value until the process of step S110, which will be discussed below, is started. In the following description, the integrated value of the intake air amount GA, which starts being integrated in step S108, will be referred to as a post resumption integrated value A2. After starting integrating the intake air amount GA, the controller 100 advances the process to step S109.

In step S109, the controller 100 determines whether the latest post resumption integrated value A2 is greater than or equal to a predetermined defined value Y. The defined value Y is an integrated value of the intake air amount GA required to discharge oxygen remaining in the filter 40 from the filter 40. When the latest post resumption integrated value A2 is less than the defined value Y (S109: NO), the controller 100 advances the process to step S111.

In step S111, the controller 100 sets the prohibition flag to ON. If the prohibition flag has already been set to ON when step S111 is started, the controller 100 keeps the prohibition flag in the ON state. When the prohibition flag is set to ON, the first condition and the second condition are no longer satisfied. Accordingly, the controller 100 prohibits the execution of the first suspending process and the second suspending process. The controller 100 advances the process to step S109 again. That is, after executing the resumption process, the controller 100 prohibits the execution of the first suspending process and the second suspending process while the prohibition flag is ON. A period during which the prohibition flag is ON corresponds to a period until the post resumption integrated value A2 reaches the defined value Y.

When the latest post resumption integrated value A2 is greater than or equal to the defined value Y in step S109 (step S109: YES), the controller 100 advances the process to step S110.

In step S110, the controller 100 sets the prohibition flag to OFF. Then, the controller 100 clears the post resumption integrated value A2, which has been continuously calculated, to zero. The controller 100 suspends calculating the post resumption integrated value A2. When the prohibition flag is OFF, the precondition related to the prohibition flag, which is one of the preconditions of the first condition and the preconditions of the second condition, is met. Therefore, the controller 100 executes the first suspending process and the second suspending process when the preconditions of the first condition and the preconditions of the second condition are met except for the precondition related to the prohibition flag. After the process of step S110, the controller 100 ends the series of control.

Operation of Present Embodiment

It is now assumed that four of the preconditions of the second condition except for the precondition related to the prohibition flag are met at time T1 as shown in FIG. 3. At this time, the controller 100 sets a request flag for the second suspending process to ON. If the prohibition flag is OFF at time T1, the controller 100 starts executing the second suspending process at time T1 in response to the request flag for the second suspending process being set to ON. As described above, the controller 100 starts calculating the suspension integrated value A1 when the second suspending process is executed. From time T1 as a starting point, the suspension integrated value A1 increases gradually.

It is assumed that thereafter, at time T2, the suspension integrated value A1 becomes greater than or equal to the second threshold X2. At this time, the controller 100 determines that the suspension integrated value A1 has become greater than or equal to the second threshold X2 and clears the suspension integrated value A1 to zero. The controller 100 then sets the prohibition flag to ON. When the prohibition flag is ON, one of the five preconditions for executing the second suspending process is no longer met. That is, the second condition is no longer satisfied. Accordingly, the controller 100 executes the resumption process so as to stop the execution of the second suspending process. Also, at time T2, the controller 100 executes the resumption process and starts calculating the post resumption integrated value A2. From time T2 as a starting point, the post resumption integrated value A2 increases.

If four of the preconditions of the second condition except for the precondition related to the prohibition flag are met at time T2, the request flag for the second suspending process remains ON. That is, although it is desirable to execute the second suspending process immediately after time T2, the execution of the second suspending process is prohibited until a certain amount of time elapses after the end of the second suspending process.

Thereafter, it is assumed that the post resumption integrated value A2 becomes greater than or equal to the defined value Y at time T3. At this time, the controller 100 clears the post resumption integrated value A2 to zero. The controller 100 then sets the prohibition flag to OFF. Thus, if four of the preconditions of the second condition except for the precondition related to the prohibition flag are met after time T3, the second suspending process can be executed again. In the example shown in FIG. 3, it is assumed that some of the four of the preconditions of the second condition except for the precondition related to the prohibition flag are not met after time T3.

Thereafter, it is assumed that four of the preconditions of the first condition except for the precondition related to the prohibition flag are met at time T4. At this time, the controller 100 sets a request flag for the first suspending process to ON. As described above, the prohibition flag is OFF at time T3, which is earlier than time T4. Thus, the controller 100 starts executing the first suspending process at time T4 in response to the request flag for the first suspending process being set to ON. As described above, the controller 100 starts calculating the suspension integrated value A1 when the first suspending process is executed. From time T4 as a starting point, the suspension integrated value A1 increases gradually.

Thereafter, it is assumed that the suspension integrated value A1 becomes equal to the first threshold X1 at time T5. At this time, the controller 100 determines that the suspension integrated value A1 has become greater than or equal to the first threshold X1 and clears the suspension integrated value A1 to zero. The controller 100 then sets the prohibition flag to ON. When the prohibition flag is ON, one of the five preconditions for executing the first suspending process is no longer met. That is, the first condition is no longer satisfied. Accordingly, the controller 100 executes the resumption process so as to stop the execution of the first suspending process. Also, the controller 100 starts calculating the post resumption integrated value A2 on condition that the resumption process is executed at time T5. From time T5 as a starting point, the post resumption integrated value A2 increases gradually.

If four of the preconditions of the first condition except for the precondition related to the prohibition flag are met at time T5, the request flag for the first suspending process remains ON. That is, although it is desirable to execute the first suspending process immediately after time T5, the execution of the first suspending process is prohibited until a certain amount of time elapses after the end of the first suspending process.

Thereafter, it is assumed that the post resumption integrated value A2 becomes greater than or equal to the defined value Y at time T6. At this time, the controller 100 clears the post resumption integrated value A2 to zero. The controller 100 then sets the prohibition flag for the first suspending process to OFF. Thus, if four of the preconditions of the first condition except for the precondition related to the prohibition flag are met after time T6, the first suspending process can be executed again. In the example shown in FIG. 3, it is assumed that some of the four of the preconditions of the first condition except for the precondition related to the prohibition flag are not met after time T6.

In the above-described example, the second suspending process is executed during the period from time T1 to time T2. When the second suspending process is executed, fuel injection is suspended in the four cylinders 11. Thus, oxygen is supplied to the filter 40 during the execution of the second suspending process. The PM deposited in the filter 40 reacts with the oxygen supplied to the filter 40 and burns. Accordingly, the temperature of the filter 40 is likely to increase during the execution of the second suspending process.

The first suspending process is executed during the period from time T4 to time T5. When performing the first suspending process, the controller 100 suspends fuel injection in the specific one of the four cylinders 11. The controller 100 injects fuel in the remaining three of the cylinders 11 to perform combustion of air-fuel mixture. During the execution of the first suspending process, oxygen is supplied to the filter 40 from the cylinders 11 in which air-fuel mixture is not burned as in the case of the second suspending process. This burns the PM deposited in the filter 40.

Air-fuel mixture is burned in three of the cylinders 11 during the execution of the first suspending process, so that burned gas is supplied to the filter 40. The burned gas flows through the filter 40 without contributing to burning of PM. The burned gas thus takes away the heat of the filter 40. As a result, the temperature of the filter 40 is less likely to increase during the execution of the first suspending process than during the execution of the second suspending process.

Advantages of Present Embodiment (1) In the above-described embodiment, the first threshold X1 is greater than the second threshold X2. As described above, the temperature of the filter 40 during the execution of the first suspending process is unlikely to exceed that during the second suspending process because of the burned gas. Thus, when executed, the first suspending process is unlikely to be stopped despite the fact that the filter 40 has not been excessively heated, so that the first suspending process can be continued.

(2) In the above-described embodiment, the controller 100 calculates, in the threshold calculating process, the first threshold X1 such that the first threshold X1 decreases as the PM deposition amount of the filter 40 at the start of the first suspending process increases. Also, the controller 100 calculates, in the threshold calculating process, the first threshold X1 such that the first threshold X1 decreases as the temperature of the filter 40 at the start of the first suspending process increases. The controller 100 calculates the second threshold X2 in the same manner. In this manner, the controller 100 reflects the amount of heat generated by burning PM and the temperature of the filter 40 at the start of each suspending process on the first threshold X1 and the second threshold X2. Accordingly, it is possible to calculate accurate thresholds for preventing the filter 40 from being excessively heated.

(3) In the above-described embodiment, the first suspending process and the second suspending process are not executed while the prohibition flag is ON. Thus, the suspending processes are not executed again while a large amount of oxygen is remaining in the filter 40 due to the suspending processes. This prevents the filter 40 from being excessively heated by a large amount of oxygen remaining in the filter when the suspending processes are each started.

(4) In the above-described embodiment, the period until the prohibition flag is set to OFF is defined as a period until the post resumption integrated value A2 from the execution of the resumption process reaches the predetermined defined value Y. That is, in the above-described embodiment, the prohibition period of each suspending process after the resumption process is defined by the post resumption integrated value A2, which has a high correlation with the amount of decrease in the oxygen remaining in the filter 40. This allows the prohibition period to be set accurately in accordance with the actual rate at which the amount of oxygen in the filter 40 decreases.

<Modifications>

The present embodiment may be modified as follows. The present embodiment and the following modifications can be combined as long as the combined modifications remain technically consistent with each other.

In the above-described embodiment, the number of the cylinders 11 in which combustion of air-fuel mixture is suspended in the first suspending process is not limited to one. In the case of the internal combustion engine 10 of the above-described embodiment, which includes the four cylinders 11, combustion of air-fuel mixture may be suspended in specific two or three of the cylinders 11.

The specific cylinder 11 in which combustion of air-fuel mixture is suspended by the first suspending process does not necessarily always need to be the same cylinder 11. For example, a period in which all the cylinders 11 sequentially perform a combustion stroke is defined as a unit period. In this case, the cylinder 11 in which combustion of air-fuel mixture is suspended may be changed for each unit period. In this case also, it can be said that combustion of air-fuel mixture is suspended in specific one of the cylinders 11 if the order of the cylinders 11 in which combustion is suspended is determined in advance.

In the above-described embodiment, the controller 100 may change the number of the cylinders 11 in which combustion of air-fuel mixture is suspended each time the controller 100 executes the first suspending process. In this case, the controller 100 may calculate the first threshold X1 such that the first threshold X1 increases as the number of the cylinders 11 in which combustion of air-fuel mixture is suspended decreases.

In this modification, a greater amount of burned gas is discharged from the cylinders 11 in which combustion is performed when the number of the cylinders 11 in which combustion of air-fuel mixture is suspended is one than when the number of the cylinders 11 in which combustion of air-fuel mixture is suspended is greater than one. This results in a greater amount of heat being taken away from the filter 40 by the burned gas, so that the temperature of the filter 40 is unlikely to increase. As a result, an extended period of the execution of the first suspending process is unlikely to heat the filter 40 excessively.

Since the configuration of this modification calculates the first threshold X1 in accordance with the number of the cylinders 11 in which combustion of air-fuel mixture is suspended, it is possible to extend the first suspending process as long as possible while preventing the filter 40 from being excessively heated.

The configuration of the vehicle is not limited to that described in the above-described embodiment. For example, the vehicle may be a hybrid electric vehicle, which includes the internal combustion engine 10 and a motor-generator as drive sources.

In the above-described embodiment, the temperature of the filter 40 may be detected by a temperature sensor. For example, a temperature sensor may be provided on a downstream side of the filter 40 in the exhaust passage 22, and the value detected by the temperature sensor may be used as the temperature of the filter 40.

The preconditions of the first and second conditions are not limited to those described in the above-described embodiment. That is, the first condition and the second condition may be changed as long as the contents of the first and second conditions define the operating state of the vehicle such that PM is burned and removed from the filter 40. For example, the first condition and the second condition may include a precondition that, in a vehicle that executes air-fuel ratio feedback control, the value of the air-fuel ratio AF obtained by the air-fuel ratio sensor 75 is within a predetermined defined range, so that the air-fuel ratio AF is stable.

The method by which the controller 100 calculates the first threshold X1 and the second threshold X2 is not limited to that described in the above-described embodiment, as long as the first threshold X1 is calculated to be greater than the second threshold X2. For example, the second threshold X2 may be calculated by multiplying the first threshold X1 by a coefficient that is less than 1 and greater than 0. The first threshold X1 may be greater than the second threshold X2 by a predetermined fixed value.

In the above-described embodiment, the first threshold X1 and the second threshold X2 may be changed as long as the thresholds X1, X2 are calculated based on the PM deposition amount of the filter 40. That is, the controller 100 does not necessarily need to calculate the first threshold X1 and the second threshold X2 based on the temperature of the filter 40, but may calculate the thresholds X1, X2 using other parameters.

One or both of the first threshold X1 and the second threshold X2 may be a fixed value that does not change according to the amount of PM. When the first threshold X1 is a fixed value and the second threshold X2 is a variable, the first threshold X1 is set in advance to a value greater than the range of the second threshold X2. When the second threshold X2 is a fixed value and the first threshold X1 is a variable, the second threshold X2 is set in advance to a value less than the range of the first threshold X1. Further, when the first threshold X1 and the second threshold X2 are both fixed values, the first threshold X1 is set in advance to be greater than the second threshold X2. In these modifications, the first threshold X1 is greater than the second threshold X2 when the amount of particulate matter deposited in the filter 40 is the same.

In the above-described embodiment, the period in which the prohibition flag is ON may be determined based on parameters different from those in the above-described embodiment. For example, the period during which the prohibition flag is ON does not necessarily need to be determined by the integrated value of the intake air amount GA, but may be a fixed time such as a specified number of seconds.

In the above-described embodiment, step S108 and the subsequent processes may be omitted. That is, the processes related to setting the prohibition flag to ON and OFF may be omitted. In this case, the processes related to the prohibition flag may be omitted from the first condition and the second condition. In this case, the preconditions related to the prohibition flag may be omitted from the first condition and the second condition. This modification also prevents the filter 40 from being excessively heated if the first threshold X1 and the second threshold X2 are set to relatively small values.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller configured to be employed in a vehicle, the vehicle including:
   an internal combustion engine including cylinders;
   an exhaust passage through which an exhaust gas from the cylinders flows; and
   a filter arranged in the exhaust passage to trap particulate matter in exhaust gas, wherein
   the controller is configured to control the internal combustion engine,
   the controller is configured to execute:
      a first suspending process that, when the vehicle satisfies a predetermined first condition, suspends combustion of air-fuel mixture in a specific one of the cylinders;
      a second suspending process that, when the vehicle satisfies a predetermined second condition, suspends combustion of air-fuel mixture in all the cylinders, the second condition being different from the first condition;
      an integration process that, during execution of the first suspending process or the second suspending process, obtains an integrated value of an intake air amount of the internal combustion engine from when the first suspending process or the second suspending process that is being executed was started; and
      a resumption process that, when the integrated value is greater than or equal to a threshold, stops the first suspending process or the second suspending process that is being executed, and resumes combustion of air-fuel mixture in all the cylinders, the threshold during the execution of the first suspending process is referred to as a first threshold, the threshold during the execution of the second suspending process is referred to as a second threshold, the first threshold is greater than the second threshold when an amount of particulate matter deposited in the filter is the same.

2. The controller according to claim 1, wherein the controller is configured to execute a threshold calculating process that calculates the first threshold and the second threshold based on the amount of particulate matter deposited in the filter, and in the threshold calculating process, the controller calculates the first threshold such that the first threshold increases as the number of the cylinders in which combustion of air-fuel mixture is stopped during the execution of the first suspending process decreases.

3. The controller according to claim 1, wherein the controller is configured to execute a threshold calculating process that calculates the first threshold and the second threshold based on the amount of particulate matter deposited in the filter, in the threshold calculating process, the controller calculates the first threshold and the second threshold such that the first threshold and the second threshold decrease as the amount of particulate matter deposited in the filter at a start of the first suspending process or the second suspending process increases, and in the threshold calculating process, the controller calculates the first threshold and the second threshold such that the first threshold and the second threshold decrease as a temperature of the filter at the start of the first suspending process or the second suspending process increases.

4. The controller according to claim 1, wherein the controller is configured to prohibit execution of the first suspending process and the second suspending process for a predetermined certain amount of time after executing the resumption process.

5. The controller according to claim 4, wherein the certain amount of time is an amount of time until the integrated value that has been integrated from when the resumption process was executed reaches a predetermined defined value.

6. A control method for an internal combustion engine, the method being performed in a vehicle, the vehicle including:

an internal combustion engine including cylinders;

an exhaust passage through which an exhaust gas from the cylinders flows; and a filter arranged in the exhaust passage to trap particulate matter in exhaust gas, wherein the control method comprises:

executing a first suspending process that, when the vehicle satisfies a predetermined first condition, suspends combustion of air-fuel mixture in a specific one of the cylinders;

executing a second suspending process that, when the vehicle satisfies a predetermined second condition, suspends combustion of air-fuel mixture in all the cylinders, the second condition being different from the first condition;

during execution of the first suspending process or the second suspending process, obtaining an integrated value of an intake air amount of the internal combustion engine from when the first suspending process or the second suspending process that is being executed was started; and when the integrated value is greater than or equal to a threshold, stopping the first suspending process or the second suspending process that is being executed, and resuming combustion of air-fuel mixture in all the cylinders, the threshold during the execution of the first suspending process is referred to as a first threshold, the threshold during the execution of the second suspending process is referred to as a second threshold, the first threshold is greater than the second threshold when an amount of particulate matter deposited in the filter is the same.

7. A controller configured to be employed in a vehicle, the vehicle including:

an internal combustion engine including cylinders;

an exhaust passage through which an exhaust gas from the cylinders flows; and a filter arranged in the exhaust passage to trap particulate matter in exhaust gas, the controller comprising:

circuitry that is configured to control the internal combustion engine, wherein the circuitry is configured to execute:

a first suspending process that, when the vehicle satisfies a predetermined first condition, suspends combustion of air-fuel mixture in a specific one of the cylinders;

a second suspending process that, when the vehicle satisfies a predetermined second condition, suspends combustion of air-fuel mixture in all the cylinders, the second condition being different from the first condition;

an integration process that, during execution of the first suspending process or the second suspending process, obtains an integrated value of an intake air amount of the internal combustion engine from when the first suspending process or the second suspending process that is being executed was started; and a resumption process that, when the integrated value is greater than or equal to a threshold, stops the first suspending process or the second suspending process that is being executed, and resumes combustion of air-fuel mixture in all the cylinders, the threshold during the execution of the first suspending process is referred to as a first threshold, the threshold during the execution of the second suspending process is referred to as a second threshold, the first threshold is greater than the second threshold when an amount of particulate matter deposited in the filter is the same.

* * * * *